United States Patent [19]

Oxley et al.

[11] Patent Number: 4,634,075
[45] Date of Patent: Jan. 6, 1987

[54] CONTROL DEVICE FOR AN INERTIA REEL SEAT BELT

[75] Inventors: Andrew N. Oxley; Douglas A. J. Oxley, both of Banbury, United Kingdom

[73] Assignee: PZ Products Limited, Banbury, United Kingdom

[21] Appl. No.: 688,636

[22] Filed: Jan. 3, 1985

[30] Foreign Application Priority Data

Jan. 9, 1984 [GB] United Kingdom ................ 8400444

[51] Int. Cl.⁴ .............................................. B60R 22/00
[52] U.S. Cl. .................................. 242/107.2; 280/808
[58] Field of Search ............ 242/107.2, 107.12, 107.6;
280/801, 806-808; 297/468, 474, 476, 479, 486

[56] References Cited

U.S. PATENT DOCUMENTS

| | | | |
|---|---|---|---|
| 4,136,422 | 1/1979 | Ivanov et al. | 280/801 X |
| 4,209,142 | 6/1980 | Booth et al. | 280/808 X |
| 4,243,350 | 1/1981 | Hall | 242/107.2 X |
| 4,371,192 | 2/1983 | Alix | 280/801 |
| 4,484,766 | 11/1984 | Buchmeier | 242/107.2 X |
| 4,522,426 | 6/1985 | Weman | 280/808 |

FOREIGN PATENT DOCUMENTS 2817741 10/1979 Fed. Rep. of Germany ...... 280/808
2082892 3/1982 United Kingdom ............. 242/107.2

Primary Examiner—John M. Jillions
Attorney, Agent, or Firm—Cushman, Darby & Cushman

[57] ABSTRACT

A member across which a seat belt passes carries a movable member which moves between first and second positions in which the seat belt is respectively gripped to inhibit rewinding. The member is attachable to a seat belt guide in a vehicle by means of a screwed rod which is pivotally connected to a guide engageable hook. The rod permits the member to follow twisting movement of the seat belt.

8 Claims, 12 Drawing Figures

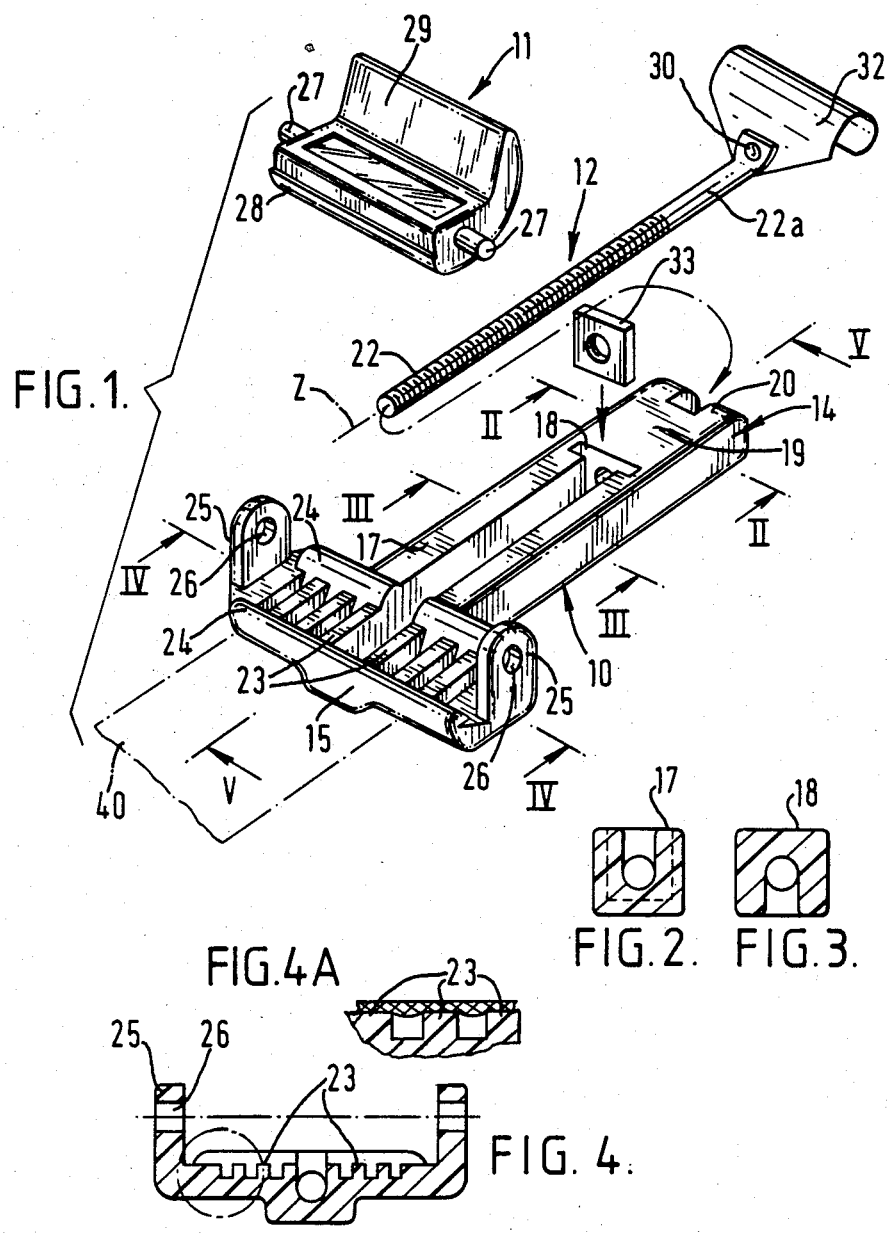

CONTROL DEVICE FOR AN INERTIA REEL SEAT BELT

The invention relates to a control device for an inertia reel seat belt.

Inertia reel seat belts are now used to a very large extent in motor vehicles. Such seat belts are useful in that any unnecessary slack in the seat belt is taken up by the inertia reel and adjustment of the seat belt length by means of buckles is unnecessary. However it has been found that the continuous tension applied to the seat belt by the inertia reel can cause annoyance to the user and in British Pat. No. 2005130 there is described a simple and very effective device for enabling a small amount of slack to be introduced in the belt. The device prevents rewinding of the seat belt by the inertia reel once slack has been introduced and thereby prevents the seat belt from applying pressure which would cause discomfort to the user.

An object of the present invention is to provide an improvement in the type of device shown in the aforesaid patent.

According to the invention there is provided a control device for an inertia reel seat belt comprising a member across which the seat belt passes when in use, a movable element mounted on said member for movement between first and second positions in which the seat belt is repsectively gripped to inhibit rewinding and released to permit rewinding, and attachment means on the member for engagement with a mounting on a vehicle, characterised in that the attachment means allows the member to turn relative to the mounting so as to enable the member to follow twisting movement of the seat belt.

Preferably the attachment means also permits the member to turn in a sense which is transverse to the turning movement resulting from seat belt twisting.

The attachment means may be pivotally mountable on the mounting in the vehicle, e.g. typically a seat belt guide.

By allowing the member to follow twisting movement of the seat belt and by permitting turning movement in a transverse sense a very useful two-plane pivoting is achieved. Moreover where the attachment means is pivotally mounted on the mounting, the member becomes virtually universally movable relative to the mounting thereby reducing greatly any tendancy for the seat belt to take up a position uncomfortable to the user.

The attachment means may conveniently comprise first and second portions which are pivotally interconnected to facilitate the aforesaid turning in a transverse sense. In such a case, the first portion may be rotatably mounted on the member with the second portion being engageable with the mounting on the vehicle.

The attachment means may permit the distance between the member and the mounting to be varied. Such a feature is particularly useful in that it enables the position of the member in relation to the user to be varied so that the member can be brought into easy reach in cases where the mounting on the vehicle is not conveniently positioned, e.g. in the case of seat belts for rear seat passengers. In the latter case, the seat belt guide is often positioned well to the rear of the passenger and where the attachment means is mounted on the guide the adjustment feature permits the member to be positioned forwardly of the guide nearer the passenger. Preferably, the turning of the member relative to the attachment means enables the distance between the member and the mounting to be varied. In such a case the attachment means may include a screw threaded portion, e.g. a rod. The screw threaded portion may engage a nut provided on the member.

The attachment means may include an attachment member which is preferably hook-shaped for location on the seat belt guide. The seat belt will then run over the hook-shaped attachment member when being withdrawn or rewound.

The screw threaded portion may be located in a channel formed in the member. The channel may house the aforesaid nut, e.g. in a recess in the channel.

The member is preferably T-shaped with the attachment member associated with the vertical limb of the T and the movable element associated with the transverse limb of the T.

Preferably the control device, in use causes the seat belt to be gripped between said movable element and a portion of the member. The said portion may comprise a plurality of spaced apart ribs which extend, e.g., in the direction of seat belt movement. The ribs provide an enhanced gripping effect when the seat belt is gripped to inhibit rewinding. The ribs may be arranged within a section, of the member (which section may be substantially tray-like) so as to lie between wall portions of the section over which the seat belt passes. Preferably the ribs have upper surfaces which lie in a plane below upper edges of said wall portions.

A control device in accordance with the invention will now be described by way of example with reference to the accompanying drawings in which:

FIG. 1 is an exploded perspective view of a preferred form of control device in accordance with the invention;

FIGS. 2, 3 and 4 are cross-sections of the control device of FIG. 1 on the lines II—II, III—III and IV—IV in FIG. 1 respectively;

FIG. 4A is an enlarged cross-sectional view of part of the control device viewed in FIG. 4 with a seat belt in place.

Figure 5:
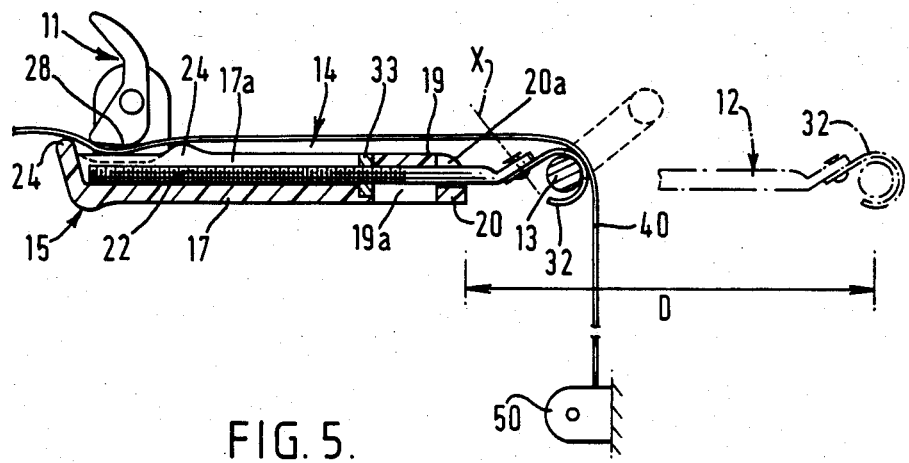
FIG. 5 is a cross-section of the assembled control device on the line V—V in FIG. 1.
Figure 10:
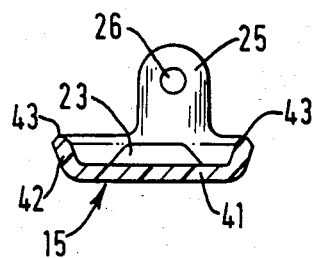
Figure 11:
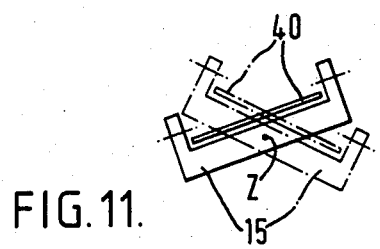
Figure 6:
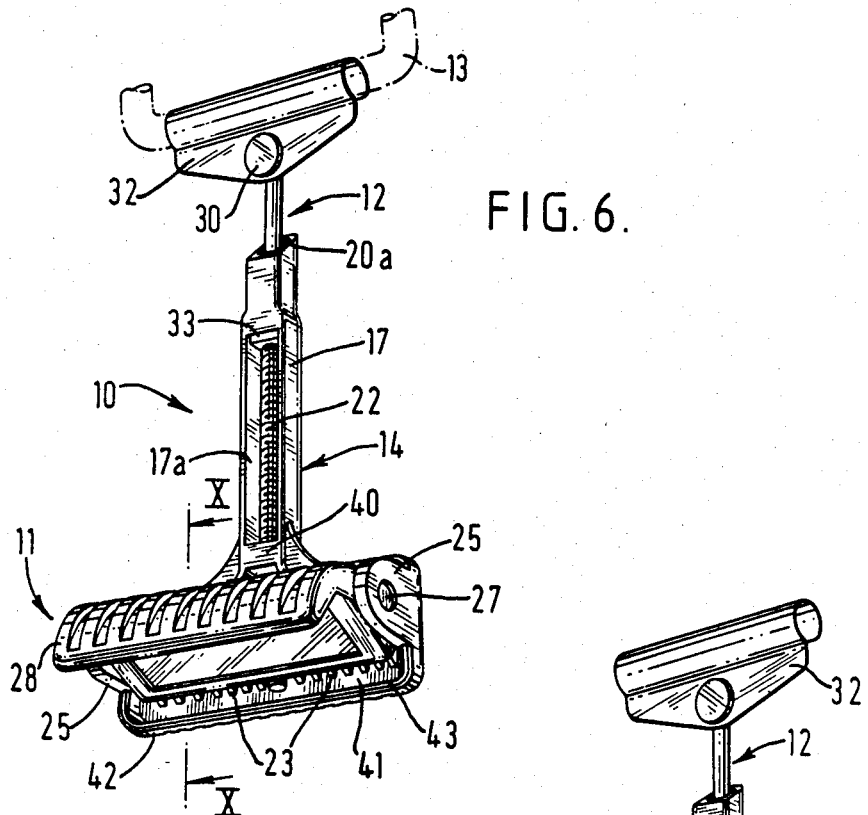
Figure 7:
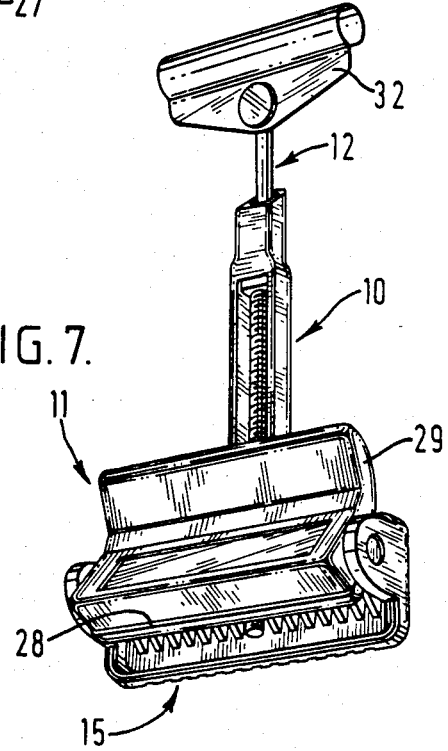
Figure 8:
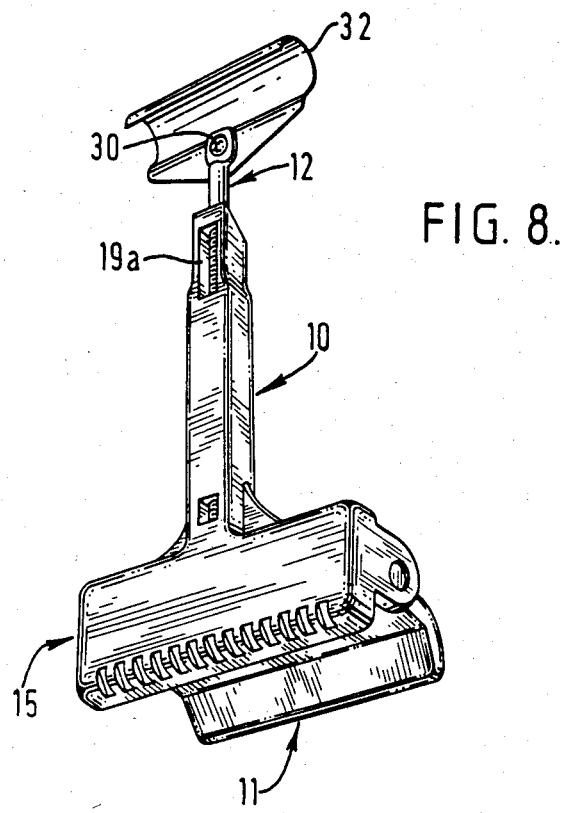
Figure 9:
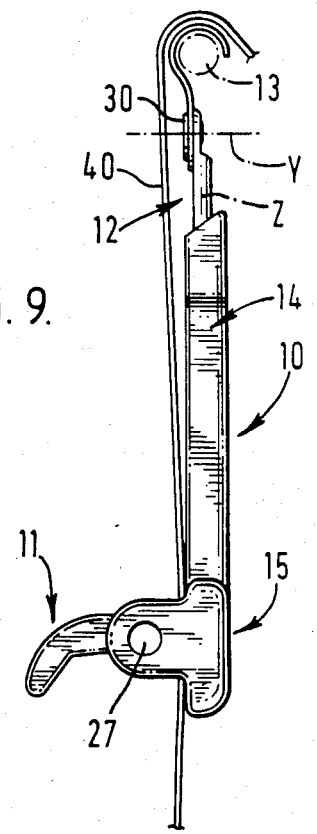

FIG. 6 is a front perspective view of an alternative version of the control device shown in FIGS. 1 to 5, FIG. 7 is a view similar to FIG. 6 with a movable element of the control device in a seat belt-release position, FIG. 8 is a rear perspective view of the control device shown in FIG. 6, FIG. 9 is a side view of the control device shown in FIG. 6, FIG. 10 is a cross section through part of the control device shown in FIG. 6 on the line X—X in FIG. 6, and FIG. 11 is a diagrammatic view of the control device indicating the way in which it permits twisting of the seat belt.

The control device comprises a T-shaped member 10, a movable element 11 and adjustable attachment means 12 by which the device can be hooked on to a mounting such as a seat belt guide 13 (FIG. 5) in a vehicle.

The member 10 comprises a longitudinal limb 14 and a transverse limb 15. The limb 14 is U-shaped in cross-section (see FIG. 2) over a section 17 between the transverse limb 15 and a transverse recess 18, is of inverted U-shaped cross-section (see FIG. 3) over an intermediate section 19 and is U-shaped in cross-section over an end section 20 between the intermediate section 19 and the right-hand end of the limb 14 as viewed in FIGS. 1 and 5. The sections 17, 19 and 20 define respective channels 17a, 19a and 20a which receive a screw threaded rod 22 of the attachment means with working clearance. The channel 17a extends into the tray-like limb 15 between an inner pair of a plurality of parallel ribs 23 which extend transversely of the limb 15 between elongated projections 24 which form opposing walls of the tray.

The upper edges of the ribs 23 lie in a plane below the projections 24 so that the seat belt is deflected against the ribs 15 as shown in FIG. 5 when gripped by the element 11. The outer ends of the limb 15 are provided with two upstanding lugs 25 formed with coaxial bores 26. The bores 26 locate pegs 27 formed at opposite ends of the movable element 11. The element 11 is formed with a seat belt engaging ledge 28 and a handle 29 and its operation is described below. The rod 22 has an unthreaded portion 22a which is pivotally connected by a rivet 30 to a sheet metal hook-like attachment 32 that hooks over the seat belt guide 13, preferably in a loose snap-fit manner to allow the attachment 32 to swing on the guide. The recess 18 houses a square nut 33 and the rod 22 screws through the nut as shown in FIG. 5. The length of the screw threaded section of the rod cannot be screwed against the facing portion of the limb 15. That feature avoids the risk of fracturing limb 15.

Reference is now made to FIGS. 6 to 10 in which parts corresponding to parts in FIGS. 1 to 5 carry the same reference numerals.

As in FIGS. 1 to 5 the control device comprises a T-shaped member 10 a movable element 11 and an adjustable attachment means 12 by which the device can be hooked on to a mounting such as a seat belt guide 13. The longitudinal limb 14 is basically the same in construction as that in FIGS. 1 to 5 except that a bridge 40 is provided which extends across channel 17a of section 17 to ensure that the screw threaded rod 22 does not lift out of the channel 17 at the end remote from the nut 33. Sections 19 and 20 define respective channels 19a and 20a for the rod 22 as above. The limb 15 is in the form of a tray having a plurality of parallel ribs 23 on its base 41 and a peripheral wall 42, end portions of which project upwardly to define the lugs 25 for the movable element 11. The peripheral wall 42 has an upstanding bead 43 which forms elongate projections on the limb 15 equivalent to projections 24 of FIGS. 1 to 5. The upper surfaces of the ribs 23 lie in a plane below the bead 43. The bottom of channel 17a and the upper surface of base 41 lie in the same plane so that the screwed rod 22 can project into the limb 15 between two of the ribs 23. The hook-like attachment 32 is riveted in a pivotal manner to the rod 22.

In use, and with the hook 32 of either control device located in the guide 13, the member 14 can be unscrewed sufficiently so as to take up a position within easy reach of the user. In the embodiment illustrated an adjustment D of up to 70 mm is possible although, of course, the control device could be designed to provide greater adjustment. After adjustment has been made, the seat belt 40 is placed between the lugs 25 and the pegs 27 of the element 11 are located in the bores 26 of lugs 25. As seen in FIG. 5 the seat belt 40 then passes from the inertia reel indicated at 50, over the hook-shaped member 32, across the limbs 14,15 and over the projections 24, (or 43 in FIGS. 6 to 10). By turning the element 11 counter clockwise as viewed in FIGS. 5 and 9 about the axis defined by pegs 27, the ledge 28 will urge the seat belt against the ribs 23. The ribs 23 tend to indent the seat belt slightly as apparent from FIG. 4A which improves the grip between the seat belt and the ribs and allows thin or thick seat belts to be clamped securely. Once the element 11 has been positioned in that way, (the aforesaid second position) the inertia reel is unable to re-wind the seat belt. The seat belt can, however, be released by pulling it in the withdrawal direction as described in British Pat. No. 2005130 to turn the element 11 clockwise and space the ledge 28 well clear of the ribs 23 (the aforesaid first position). On pulling the seat belt 40 in the withdrawal direction, the deflected section between projections 24 tends to straighten and creates an additional force which assists rotation of the element 11. The belt can then be re-wound by the inertia reel.

As well as providing adjustment of the member 10 towards or away from the guide 13 the screw threaded rod 22 also allows the member 10 to turn about the axis of the rod relative to the guide. Moreover the rivet 30 permits pivoting of the member 10 about an axis Y (FIGS. 5 and 9) transverse to the axis Z of the rod 22, and, as stated above, the attachment 32 can swing on the guide 13 clockwise or anticlockwise as viewed in FIGS. 5 and 9. The control device is therefore substantially universally movable relative to the guide 13 and will permit the seat belt to follow a substantially straight line (except for the portion clamped by the element 11) between the guide 13 and the shoulder of the user. This is particularly desirable as the belt itself is not constained by the control device towards a position which could cause discomfort to the user. In particular the fact that the member 10 can rotate about the axis Z is very useful in that it ensures that member 10 can follow the seat belt 40 as shown in FIG. 11 when seat belt twists relative to the guide so as to lie flat against the body of the user.

We claim:

1. A control device for an inertia reel seat belt comprising a member across which a portion of the seat belt passes when in use, a movable element mounted on said member for movement between first and second positions in which the seat belt is respectively gripped to inhibit rewinding and released to permit rewinding, and attachment means pivotally connected to the member for engagement with a mounting on a vehicle and which allows the member to swivel about an axis extending in the longitudinal direction of said portion of the seat belt to enable the member to follow twisting movement of the seat belt, said attachment means comprising first and second portions interconnected by a pivot element defining a further axis of swivelling transverse to the first said axis and about which the member can swivel, said first portion being pivotally connected to the member to enable the member to swivel about the first said axis and the second portion being engageable with the mounting on the vehicle.

2. A control device according to claim 1 in which said attachment means is connected to said member by means which permits the position of the member relative to the mounting to be infinitely varied in the longitudinal direction of said portion of the seat belt.

3. A control device according to claim 2 in which the connection between said attachment means and said member enables said distance to be infinitely varied by rotating the member about the first said axis.

4. A control device according to claim 3 in which the first portion is screw-threaded whereby rotation of said member about the screw threaded portion causes the longitudinal position of the member relative to the mounting to be infinitely varied.

5. A control device according to claim 4 wherein the screw threaded portion is located in a channel formed in the member.

6. A control device for an inertia reel seat belt comprising an elongate member across which a portion of the seat belt passes when in use, a movable element mounted on said member for movement between first and second positions in which the seat belt is respectively gripped to inhibit rewinding and released to permit rewinding and attachment means pivotally connected to the member and which allows the member to pivot to follow twisting movement of the seat belt, said attachment means comprising a rod-like first part which extends longitudinally of the member and which defines a first axis about which the member pivots, and a hook-like second part which locates on said mounting, said first and second parts being pivotally interconnected to define a second axis of pivoting transverse of the first axis, the rod-like first part being screw threaded and being connected to the member by means of a screw thread on said member engaged by said rod-like first part so that the rotation of the member about said rod will vary the relative longitudinal positions of said rod-like part and member thereby varying the longitudinal position of the member relative to the first part of the attachment means.

7. A control device according to claim 6 in which the elongate member defines a channel in which the screw threaded rod-like part locates and which houses a screw threaded element engaging said rod-like part.

8. A control device according to claim 7 in which the member is T-shaped with the vertical limb of the T defining said channel and the aforesaid moveable element associated with the horizontal limb.

* * * * *